(12) United States Patent
Wolfgang et al.

(10) Patent No.: US 8,370,033 B2
(45) Date of Patent: Feb. 5, 2013

(54) METHOD FOR CONTROLLING AN AUTOMATED MULTISTEP CHANGE-SPEED GEARBOX

(75) Inventors: Werner Wolfgang, Ravensburg (DE); Maik Wuerthner, Friedrichshafen (DE); Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 619 days.

(21) Appl. No.: 12/664,077

(22) PCT Filed: May 27, 2008

(86) PCT No.: PCT/EP2008/056451
§ 371 (c)(1),
(2), (4) Date: Dec. 11, 2009

(87) PCT Pub. No.: WO2008/155193
PCT Pub. Date: Dec. 24, 2008

(65) Prior Publication Data
US 2010/0185367 A1 Jul. 22, 2010

(30) Foreign Application Priority Data
Jun. 16, 2007 (DE) .......................... 10 2007 027 771

(51) Int. Cl.
*G06F 19/00* (2011.01)
(52) U.S. Cl. .......................................... 701/52; 701/58
(58) Field of Classification Search ............... 701/51–66
See application file for complete search history.

(56) References Cited

U.S. PATENT DOCUMENTS

| | | | | |
|---|---|---|---|---|
| 4,354,236 A | * | 10/1982 | Miki et al. | 701/66 |
| 4,713,764 A | * | 12/1987 | Klatt | 701/65 |
| 5,169,365 A | * | 12/1992 | Friedmann | 474/18 |
| 5,231,897 A | * | 8/1993 | Morita | 477/120 |

(Continued)

FOREIGN PATENT DOCUMENTS

| | | |
|---|---|---|
| DE | 195 27 112 C1 | 9/1996 |
| DE | 694 03 419 T2 | 12/1997 |

(Continued)

OTHER PUBLICATIONS

Kulkarni et al, Shift Dynamics and Control of Dual-Clutch Transmissions, Mechanism and Machine Theory, vol. 42, No. 2, Feb. 2007, pp. 168-182.*

(Continued)

*Primary Examiner* — Russell Frejd
(74) *Attorney, Agent, or Firm* — Davis & Bujold, PLLC

(57) ABSTRACT

A method of controlling an automated multi-step change-speed transmission of a vehicle having an electronic control unit connected to sensors for detecting operating parameters and to gear and/or clutch control elements for carrying out shift operations. The control comprises a data memory such that the multi-step change-speed transmission can be operated automatically to initiate gearshifts in an automatic mode, manually initiated by a driver in a manual mode to provide gearshifts, and manually actuated in a learning mode in which gearshifts and operating parameters can be recorded automatically. When necessary to assist technicians in the application of the transmission, a configuration-learning mode that can be activated in which, during a test drive with manual gearshift initiation, operating parameters are automatically detected in an event-dependent manner, processed to produce control data for the transmission, and the control data stored in the data memory for the future control of the transmission.

8 Claims, 1 Drawing Sheet

| $n\_mot$ [1/min] \ $m\_ind$ [%] | 600 | 1100 | 1500 | 1850 | 2000 | 2200 |
|---|---|---|---|---|---|---|
| 3 | 0.81 | 0.90 | 0.90 | 0.90 | 0.85 | 0.85 |
| 20 | 0.86 | 0.90 | 0.90 | 0.90 | 0.85 | 0.85 |
| 40 | 0.89 | 0.90 | 0.90 | 0.90 | 0.85 | 0.85 |
| 60 | 1.00 | 1.00 | 1.00 | 0.95 | 0.90 | 0.93 |
| 80 | 1.00 | 1.00 | 1.00 | 0.95 | 0.90 | 0.93 |
| 100 | 1.00 | 1.00 | 1.00 | 0.98 | 0.95 | 0.93 |

U.S. PATENT DOCUMENTS

| | | | |
|---|---|---|---|
| 5,519,610 A | 5/1996 | Tsutsui et al. | |
| 6,253,139 B1 | 6/2001 | Borodani et al. | |
| 6,311,114 B1 | 10/2001 | Graf et al. | |
| 7,286,922 B1 * | 10/2007 | Fischer et al. | 701/51 |
| 7,363,116 B2 | 4/2008 | Flechtner et al. | |
| 8,165,764 B2 * | 4/2012 | Wolfgang et al. | 701/58 |
| 8,188,385 B2 * | 5/2012 | Wolfgang et al. | 177/136 |

FOREIGN PATENT DOCUMENTS

| | | |
|---|---|---|
| DE | 197 52 623 A1 | 6/1999 |
| DE | 199 16 808 A1 | 11/2000 |
| DE | 101 34 997 A1 | 3/2002 |
| DE | 101 48 091 A1 | 4/2003 |
| DE | 10 2005 013 697 A1 | 9/2006 |
| EP | 0 645 559 B1 | 5/1997 |
| EP | 0 950 839 A2 | 10/1999 |
| EP | 1 045 173 A2 | 10/2000 |

OTHER PUBLICATIONS

Lucente et al, Modelling of an Automated Manual Transmission System, Mechatronics, vol. 17, No. 2-3, Mar.-Apr. 2007, pp. 73-91.*

Levi, Design Considerations for Motors Used in Adjustable-Speed Drives, IEEE Transactions on Industry Applications, vol. IA-20, No. 4, Jul./Aug. 1984, pp. 822-826.*

* cited by examiner

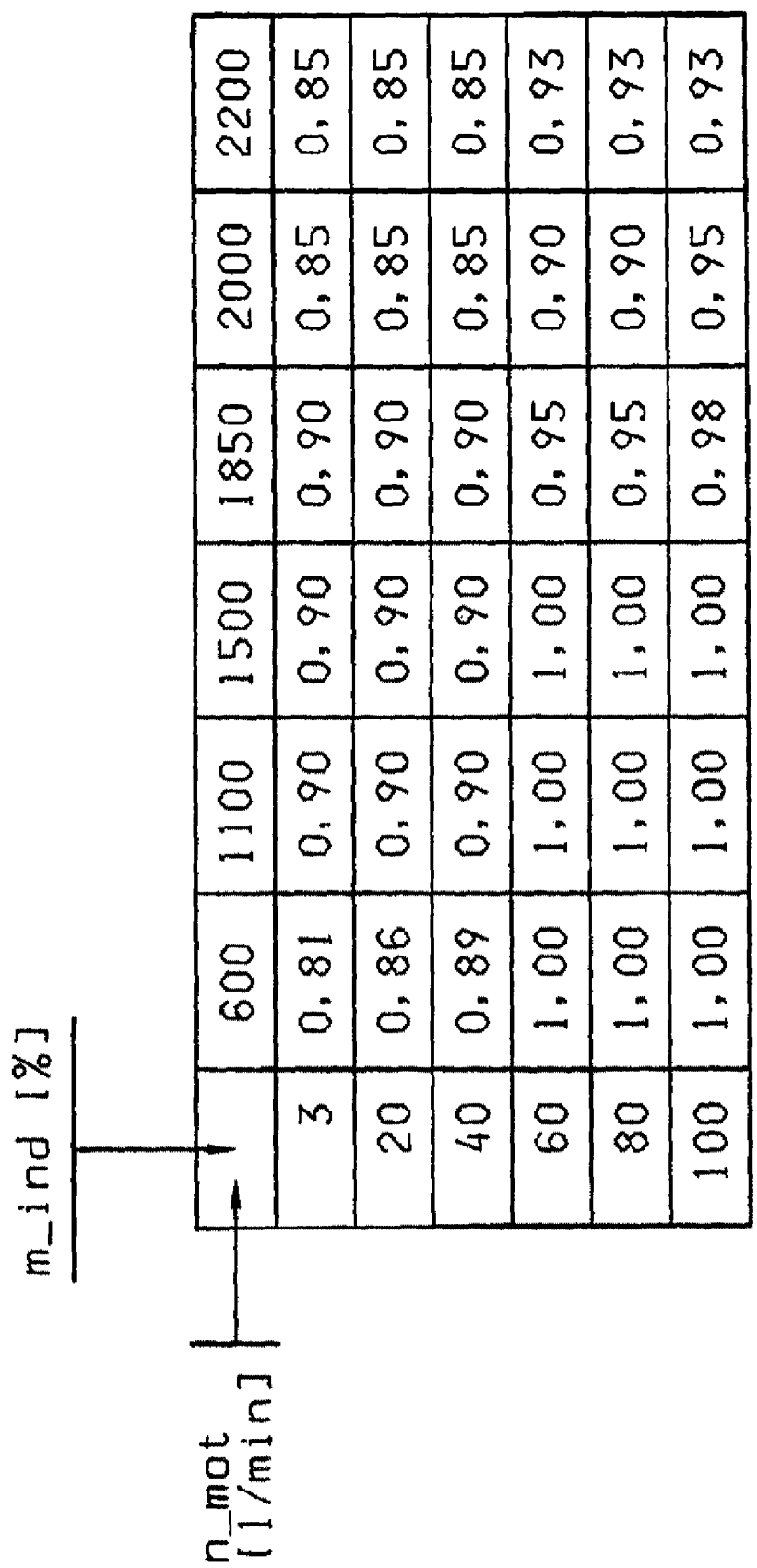
| n_mot [1/min] \ m_ind [%] | 600 | 1100 | 1500 | 1850 | 2000 | 2200 |
|---|---|---|---|---|---|---|
| 3 | 0,81 | 0,90 | 0,90 | 0,90 | 0,85 | 0,85 |
| 20 | 0,86 | 0,90 | 0,90 | 0,90 | 0,85 | 0,85 |
| 40 | 0,89 | 0,90 | 0,90 | 0,90 | 0,85 | 0,85 |
| 60 | 1,00 | 1,00 | 1,00 | 0,95 | 0,90 | 0,93 |
| 80 | 1,00 | 1,00 | 1,00 | 0,95 | 0,90 | 0,93 |
| 100 | 1,00 | 1,00 | 1,00 | 0,98 | 0,95 | 0,93 |

US 8,370,033 B2

METHOD FOR CONTROLLING AN AUTOMATED MULTISTEP CHANGE-SPEED GEARBOX

This application is a National Stage completion of PCT/EP2008/056451 filed May 27, 2008, which claims priority from German patent application serial no. 10 2007 027 771.9 filed Jun. 16, 2007.

FIELD OF THE INVENTION

The invention concerns a method for controlling an automated multistep change-speed transmission of a motor vehicle, with an electronic control unit connected to sensors for detecting operating parameters and to gear and/or clutch control means for carrying out shift operations, and which comprises a data memory for storing control data, such that the multistep change-speed transmission can be operated in an automatic mode with automatic gear shifts, in a manual mode with shifts carried out manually by a driver, and in a learning mode in which shifts are carried out manually and operating parameters can be detected automatically.

BACKGROUND OF THE INVENTION

For a long time already motor vehicles with automated multistep change-speed transmissions have been known, such as converter automatic transmissions, automated change-speed transmissions and automated dual-clutch transmissions, in which the shift operations can be carried out optionally in an automatic mode with operating-parameter-dependent, program-controlled shift initiation and in a manual mode with manual shift initiation. In the automatic mode the shifts are initiated automatically by virtue of stored shift characteristics or shift performance graphs as a function of operating parameters detected by sensors, such as driving speed, accelerator pedal position, engine load and engine speed. In contrast, in the manual mode shifts are initiated by the driver himself, by actuating corresponding shift actuation elements such as a selector lever in a shift console (within a manual shift gate) and shift buttons or shift keys arranged on the steering wheel.

In the automatic mode the shifting speeds, gear intervals and shift sequence of shift operations are determined essentially by the driving strategy of the shift program concerned, i.e. by an imposed operating property of the motor vehicle or its drivetrain followed by the shift program, such as the lowest possible fuel consumption, the greatest possible driving comfort or the maximum possible driving dynamics. To enable the driver to choose between a number of driving strategies, there is often a choice between at least two shift programs. These are for example an eco-shift program with relatively low shift speeds in order to achieve low fuel consumption, and a sporty shift program with relatively high shift speeds to achieve high acceleration ability, between which the driver can choose by operating a selector switch arranged on the shift console or on the steering wheel. It has even been proposed that the selection and actuation of the shift program should take place automatically in each case, by a driver-type determination based on sensor detection of the driver's driving behavior and/or the movement dynamics of the motor vehicle.

However, since for most drivers the possibility of choosing between two or three shift programs does not enable a satisfactory adaptation of the shifting behavior to their personal driving habits, several proposals have already been made for adapting the shifting behavior of an automated multistep change-speed transmission to suit individual drivers.

For example, in DE 694 03 419 T2 (EP 0 645 559 B1) a control device for an automatic transmission is described, with which in the manual mode a learning mode can be activated, in which, whenever a shift is initiated manually, operating parameters are detected and evaluated for the determination of driver-specific shift programs, i.e. shift characteristic or performance graphs that correspond to individual drivers. The operating parameters are evaluated by a neuronal network and include a statistical evaluation of the manually initiated shifts and an assessment of those shifts in relation to fuel consumption and the traction power of the drive engine. The learning mode is terminated when the changes of learned shift characteristics brought about by further manually initiated shifts remain within specified tolerance limits.

From DE 197 52 623 C2 a control system for an automatic motor vehicle transmission is known, in which the shifting behavior of the multistep change-speed transmission can be influenced by carrying out shifts manually, without a special learning mode having to be activated for this. The driver-specific adaptation of shift characteristics takes place by virtue of fuzzy-production rules and is based on the superposed interpolation between at least two existing limit shift characteristics in each case.

In a further method known from DE 199 16 808 A1 at least one predefined driving program, i.e. the corresponding shift characteristics or performance graphs of an automatic mode, are assumed as given. The existing driving program is then modified in a driver-specific manner by evaluating operating parameters detected in the manual mode during manually initiated shifts. The operating parameters are detected and the existing driving program is modified in a learning mode that can be activated. During the modification of the existing driving program, safety-relevant parts of the program remain unchanged.

A similar method is described in DE 101 34 997 A1. This known method starts from an electronic control unit with a program memory, in which is stored a control program for controlling a transmission and if necessary a clutch, i.e. a shifting program for the automatic mode, as a function of sensor-determined operating parameters. The program memory also contains a program by means of which the existing control program can be adapted to the operating behavior desired by the driver on the basis of driver inputs such as manually initiated shifts. The driver-specific control program can be stored on an external data carrier such as a memory card that can even be used as a vehicle key.

All the above-described control devices and methods have in common that the determination of the driver-specific shift programs, i.e. special shift characteristics or shift performance graphs corresponding to the driver's wishes in each case, is based on the known operating parameters of the respective motor vehicle or drivetrain and on the modification of at least one existing shift program, and consists in the modification of shift characteristics or performance graphs established during the development of the vehicle. Without knowledge of the essential operating properties of the drivetrain and the presence of at least one basis shift program that serves as an initial data set, a driver-specific shift program cannot be determined by the known methods.

The operating parameters that are relevant for the control of a multistep change-speed transmission of a motor vehicle, in particular its drivetrain, and the shift characteristics and performance graphs of at least one shift program that can also be used as the initial data set for further, driver-specific shift programs, are determined as part of the development of a new motor vehicle or the application of a multistep change-speed transmission in another motor vehicle, by highly qualified technical personnel such as the development, testing and application engineers of the vehicle or transmission manufacturer concerned, and are stored in a data memory of the transmission control unit. Owing to the multiplicity of the functions involved, during this it is necessary to store several thousand parameters and characteristics just for the basic functions of the multistep change-speed transmission, such as evaluating transmission and clutch sensors, actuating gear and clutch control elements and controlling the time sequencing of shift operations, as well as further thousands of parameters and characteristics for each driving strategy, many of which, in the context of a new application, have to be changed or adapted for the new application. Until now this has taken place during elaborate and time-consuming test runs by corresponding technical personnel, since such parameter and characteristic values are for example input or changed by means of a laptop connected to the transmission control unit and perhaps also to the engine control unit.

Since this procedure is relatively elaborate and time-consuming and must be carried out by appropriately trained technical personnel, the purpose of the present invention is to indicate a method for controlling an automated multistep change-speed transmission, by virtue of which the technical personnel can be substantially assisted while determining parameters and characteristics for setting up or modifying a shift program.

SUMMARY OF THE INVENTION

The invention concerns a method for controlling an automated multistep change-speed transmission of a motor vehicle, with an electronic control unit connected to sensors for the detection of operating parameters and to gear and/or clutch control elements for carrying out shifting operations and comprising a data memory for storing control data, such that the multistep change-speed transmission can be operated in an automatic mode in which shifts can be initiated automatically, in a manual mode in which shifts are initiated manually by a driver, and in a learning mode in which shifts are initiated manually and operating parameters can be recorded automatically.

In addition, to achieve the stated objective a configuration-learning mode that can be activated when necessary is provided, in which, during a test drive with manual shift initiation, operating parameters are detected in an event-dependent manner, processed to produce control data for the multistep change-speed transmission, and the control data are stored in the data memory for the future control of the multistep change-speed transmission.

The invention is based on the recognition that many operating parameters that serve directly or indirectly for determining control data for the control of a multistep change-speed transmission during a test drive in which the relevant operating points are encountered deliberately or by chance, should advantageously be registered and evaluated automatically. This substantially facilitates and speeds up the configuration work to be done by the technical personnel involved, so that the activity can even be carried out by less experienced testing or application engineers. To implement the method it is generally not necessary for any control data, that can be used as basis data to be modified, to be present.

Since for safety reasons use of the configuration-learning mode should only be possible during vehicle development by technical personnel but not during later driving operation by an ordinary driver, to restrict the use of the configuration-learning mode to technical personnel its activation takes place expediently via access control means. The access control means can for example be hardware-based in the form of a coding plug that can be connected to a diagnosis plug socket and which contains a plug bridge, or for example, software-based in the form of a recordable data bit of a control variable present in the data memory. It is also possible to release the configuration-learning mode for use by the input of a secret digital code using the keyboard of an existing on-board computer.

In a first preferred application of the configuration-learning mode according to the invention, it is provided that during a test drive for a predetermined number of operating points, each defined by a combination of a particular engine speed n_mot and a particular induced engine torque m_ind derived from the quantity of fuel injected into the drive engine, respective operating parameters for determining the actual traction force f_zug acting on the drive wheels are determined, and from the traction force f_zug determined, in each case a torque efficiency eta of the drive engine is calculated and stored in a corresponding data field of the data memory.

This function is particularly relevant for utility vehicles when an existing multistep change-speed transmission is to be used in combination with a new drive engine. The values of the torque efficiency eta determined give in each case the ratio of the actual drive torque m_mot existing on the drive wheels and reduced at the crankshaft of the drive engine, in relation to the induced engine torque m_ind derived from the fuel injection quantity, and are needed for example for the consumption-dependent determination of shift characteristics and shift performance graphs and for the later determination of the vehicle mass m_fzg during driving operation.

The effective traction force is preferably calculated after determination and input of the vehicle mass m_fzg and the rolling resistance f_roll during a test drive at low driving speed on flat ground, in each case using a simplified driving resistance equation. The driving resistance equation:

$$f\_zug = f\_steig + f\_roll + f\_träg + f\_teta + f\_luft$$

in which f_zug is the traction force at the wheels, f_steig the slope-related drive force, f_roll the rolling resistance, f_träg the inertial force due to the vehicle's mass, f_teta the mass moment of inertia force due to the rotating masses and f_luft is the air resistance, is simplified when driving on flat ground (f_steig=0) and at low speed (f_luft=0), to:

$$f\_zug = f\_roll + f\_träg + f\_teta$$

From the equation f_zug=m_mot*i_gg*i_ha/r_dyn, in which m_mot is the engine torque, i_gg the transmission ratio, i_ha the ratio of the rear axle or drive axle and r_dyn is the dynamic tire radius of the drive wheels, and with f_teta=m_teta* i_gg*i_ha/r_dyn in which m_teta is the mass moment of inertia of the rotating masses, i.e. the drive motor, the transmission, the driveshaft and the drive wheels and with f_träg=m_fzg*a_fzg (in which m_fzg is the mass of the vehicle and a_fzg is its acceleration), and with m_teta=dn_mot*(J_mot+J_getr), where dn_mot is the speed gradient of the drive engine, J_mot is the moment of inertia of the drive engine and J_getr is the moment of inertia of the transmission, by insertion and transposition the following equation is obtained for the engine torque m_mot:

$$m\_mot = (f\_roll + m\_fzg*a\_fzg)/(i\_gg*i\_ha/r\_dyn) + dn\_mot*(J\_mot + J\_getr)$$

From the engine torque m_mot calculated in this way the respective torque efficiency eta is given by the equation:

$$eta = m\_mot/m\_ind$$

in which m_ind is the induced engine torque determined in the engine control system from the quantity of fuel injected.

Since experience shows that the relationship between the induced engine torque m_ind derived from the fuel injection quantity and the engine torque m_mot back-calculated from the traction force f_zug at the drive wheels changes with the operating temperature t_mot of the drive engine, the operating parameters are preferably determined at various operating temperatures t_mot of the drive engine, and the torque efficiencies eta determined are each stored in a temperature-specific data field. During later driving operation, in each case data appropriate for the current operating temperature t_mot of the drive engine are then accessed.

The user of a method according to the invention converted into a computer program and installed in a computer, i.e. the development engineer concerned when using this application after activation of the configuration-learning mode, only has to input into the computer the vehicle's mass m_fzg determined for example on a weigh-bridge and the rolling resistance f_roll known for the weight category of the motor vehicle, and then, while driving slowly on flat ground, more or less deliberately drive at the operating points where the respective operating parameters are automatically determined and, from them, the torque efficiency eta in each case is determined and stored in the appropriate data field.

In a second preferred application of the configuration-learning mode according to the invention, it is provided that during a test drive for a predetermined number of operating points, each defined by a combination of a particular actual gear, a particular accelerator pedal position, a particular vehicle mass and a particular driving resistance, in each case when a shift is initiated manually the operating parameters concerned are determined and the respective gear interval is stored in an appropriate data field of the data memory.

This function too is mainly important for utility vehicles and can be used when an already existing automated multi-step change-speed transmission is to be used in a new type of motor vehicle, and the vehicle manufacturer specifies to the transmission manufacturer certain gear sequences or gear intervals in the context of a preferred driving strategy. In this case, when the configuration-learning mode has been activated the corresponding gear intervals need only be specified by carrying out the corresponding shifts manually. These gear interval data, together with the parameters actual gear, accelerator pedal position, vehicle mass and driving resistance which are determined automatically at the same time, are automatically stored in the appropriate performance graphs of the data field and are therefore available as control data for future driving operation.

Since while driving in the configuration-learning mode a driver may quite possibly not manage to drive at all the specified operation points, it is preferably provided that the values not encountered during the test drive are determined by interpolation, extrapolation or some other correlation with existing values and the resulting values are stored in the appropriate data field of the data memory.

To increase the accuracy of the operating parameters determined and the control data derived from them, it is advantageous for the values from operating points encountered several times during a test drive to be averaged or otherwise statistically evaluated, and for the resulting eta-values to be stored in the appropriate data field of the data memory.

Likewise, it is preferably provided that an acoustic and/or visual signal is emitted when all the specified operating points have been encountered and the values concerned have been determined, or when the values for operating points not encountered can be derived by interpolation, extrapolation or some other correlation from available values. This indicates to the development engineer concerned whether the test drive can be terminated or must continue for the determination of further values for not yet encountered operating points.

BRIEF DESCRIPTION OF THE DRAWING

To clarify the invention, the description of a FIGURE is attached. This single FIGURE shows a data field with torque efficiency values determined for a number of operating points.

DETAILED DESCRIPTION OF THE PREFERRED EMBODIMENTS

In the attached table, a torque efficiency eta is indicated for each of several operating points respectively defined by a pair of values consisting of a particular engine speed n_mot of the drive engine of a motor vehicle, and a particular induced engine torque m_ind derived from the fuel injection quantity of the drive engine and expressed here as a percentage of the maximum value.

According to the invention, these torque efficiency values eta were determined in an activated configuration-learning mode, in that during a test drive preferably carried out at low driving speed on flat ground, at the operating points concerned, in each case operating parameters for determining the actual traction force f_zug acting on the drive wheels were determined automatically, the traction force f_zug was calculated from the operating parameters using a simplified driving resistance equation, and the relevant torque efficiency eta of the drive engine was calculated from the traction force f_zug and the transmission ratio acting between the drive engine and the drive wheels, this eta then being stored in the data field of a data memory represented in the table.

During normal driving operation, if for example a more accurate value of the current engine torque m_mot is required in order to determine the vehicle's mass m_fzg from the current driving resistance, this can be determined by multiplication of the induced engine torque m_ind derived from the fuel injection quantity of the drive engine, by the respective appropriate torque efficiency eta. Besides a general uncertainty in the determination of the induced engine torque m_ind, the torque efficiency eta in each case also takes into account the efficiency of the entire drivetrain between the drive engine and the drive wheels.

Indexes
a_fzg Vehicle acceleration
dn_mot Speed gradient of the drive engine
eta Torque efficiency
f_luft Air resistance
f_roll Rolling resistance
f_steig Slope-related output force
f_teta Mass moment of inertia force due to the rotating masses
f_träg Mass moment of inertia of the vehicle's mass
f_zug Traction force (at the drive wheels)
i_gg Transmission ratio
i_ha Rear axle (drive axle) ratio
J_getr Moment of inertia of the transmission
J_mot Moment of inertia of the drive engine
m_fzg Mass of the vehicle
m_ind Induced engine torque
m_teta Mass moment of inertia of the rotating masses
n_mot Engine speed
r_dyn Dynamic tire radius
t_mot Operating temperature of the drive engine

The invention claimed is:
1. A method of controlling an automated multi-step change-speed transmission of a motor vehicle comprising an electronic control unit connected to sensors for detecting operating parameters and connected to at least one of gear and clutch control elements for carrying out shift operations and comprising a data memory for storing control data such that the multi-step change-speed transmission being operable (a) in an automatic mode in which gearshifts are initiated automatically, (b) in a manual mode in which gearshifts are initiated manually by a driver, and (c) in a learning mode in which gearshifts are actuated manually and operating parameters are recorded automatically, the method comprising the steps of:

activating a configuration-learning mode in which, during a test drive with manual gearshift initiation, operating parameters are automatically detected in an event-dependent manner;

processing the operating parameters to produce control data for the multi-step change-speed; and storing the control data in the data memory for future control of the multi-step change-speed transmission such that; during a test drive for a predetermined number of operating points, each defined by a combination of a particular engine speed (n_mot) and a particular induced engine torque (m_ind) derived from a fuel injection quantity of a drive engine, respective operating parameters for determining a current traction force (f_zug) acting at drive wheels of the vehicle are determined, and from the determined traction force (f_zug), in each case a torque efficiency (eta) of the drive engine is calculated and stored in an appropriate data field of the data memory.

2. The method according to claim 1, further comprising the steps of calculating the traction force (f_zug) acting after determination and input of the vehicle's mass (m_fzg) and rolling resistance (f_roll) during the test drive at a low driving speed on flat ground, in each case using a simplified driving resistance equation.

3. The method according to claim 1, further comprising the steps of determining the operating parameters at various operating temperatures (t_mot) of the drive engine, and determining the torque efficiencies (eta) in each case stored in a temperature-specific data field.

4. A method of controlling an automated multi-step change-speed transmission of a motor vehicle comprising an electronic control unit connected to sensors for detecting operating parameters and connected to at least one of gear and clutch control elements for carrying out shift operations and comprising a data memory for storing control data such that the multi-step change-speed transmission being operable (a) in an automatic mode in which gearshifts are initiated automatically, (b) in a manual mode in which gearshifts are initiated manually by a driver, and (c) in a learning mode in which gearshifts are actuated manually and operating parameters are recorded automatically, the method comprising the steps of:

activating a configuration-learning mode in which, during a test drive with manual gearshift initiation, operating parameters are automatically detected in an event-dependent manner;

processing the operating parameters to produce control data for the multi-step change-speed; and storing the control data in a data memory for future control of the multi-step change-speed transmission such that, during a test drive for a predetermined number of operating points, each defined by a combination of a particular actual gear, a particular accelerator pedal position, a particular vehicle mass (m_fzg) and a particular driving resistance, in each case when a gearshift is initiated manually the operating parameters concerned are determined, and a respective gear interval is stored in an appropriate data field of the data memory.

5. The method according to claim 4, further comprising the step of determining the torque efficiency values (eta), for operating points not encountered during the test drive, by one of interpolation, extrapolation and some other correlation with existing torque efficiency values (eta), and storing the determined torque efficiency values (eta) in the appropriate data field of the data memory.

6. The method according to claim 5, further comprising the step of, for operating points encountered more than once during the test drive, one of averaging and statistically evaluating the torque efficiency values (eta), and storing the resulting torque efficiency values (eta) in the appropriate data field of the data memory.

7. The method according to claim 6, further comprising the step of emitting at least one of an acoustic and a visual signal when, during the test drive, when at least one of (a) all the specified operating points are encountered and the torque efficiency values (eta) are determined and (b) the torque efficiency value (eta) for operating points not encountered are derivable from existing values (eta) by one of interpolation, extrapolation or some other correlation.

8. The method according to claim 4, further comprising the step of restricting activation to the configuration-learning mode, via an access controlling device, for use by technical personnel.

* * * * *